US009673515B2

(12) United States Patent
Crowley

(10) Patent No.: US 9,673,515 B2
(45) Date of Patent: Jun. 6, 2017

(54) WIRELESS CONFORMAL ANTENNA SYSTEM AND METHOD OF OPERATION

(76) Inventor: Robert J. Crowley, Sudbury, MA (US)

(*) Notice: Subject to any disclaimer, the term of this patent is extended or adjusted under 35 U.S.C. 154(b) by 1365 days.

(21) Appl. No.: 13/066,141

(22) Filed: Apr. 7, 2011

(65) Prior Publication Data

US 2011/0255708 A1 Oct. 20, 2011

Related U.S. Application Data

(60) Provisional application No. 61/341,941, filed on Apr. 7, 2010.

(51) Int. Cl.
*H04B 15/00* (2006.01)
*H01Q 1/40* (2006.01)
*H01Q 7/00* (2006.01)

(52) U.S. Cl.
CPC .......... *H01Q 1/40* (2013.01); *H01Q 7/00* (2013.01); *Y10T 29/49018* (2015.01)

(58) Field of Classification Search
CPC .......... H04B 1/18; H04B 1/30; H04B 1/1027; H04B 7/0871
USPC .......... 343/893; 455/132–141, 334–340, 455/296–312, 101, 501–506
See application file for complete search history.

(56) References Cited

U.S. PATENT DOCUMENTS 4,169,245 A * 9/1979 Crom .......... G01S 3/46 324/76.33
4,404,563 A * 9/1983 Richardson .......... H04B 7/086 342/368
6,314,304 B1 * 11/2001 Uesugi .......... H04W 16/02 455/517
6,574,235 B1 * 6/2003 Arslan .......... H04B 1/71075 370/201
6,798,765 B2 * 9/2004 Larsson .......... H04B 7/2606 370/351
8,475,396 B2 * 7/2013 Jones .......... A61B 7/026 600/586
8,743,986 B2 * 6/2014 Kim .......... H04B 7/024 375/267
8,787,907 B2 * 7/2014 Jain .......... H04W 16/14 370/328
2004/0131201 A1 * 7/2004 Hundal .......... H04M 9/082 381/77
(Continued)

*Primary Examiner* — Edward Urban
*Assistant Examiner* — Rui Hu
(74) *Attorney, Agent, or Firm* — Don Halgren

(57) ABSTRACT

A conformal antenna system comprising one or more proximate antenna elements for very reliable localized reception and transmission of radiowave energy and power particularly in frequency controlled VHF, UHF and microwave spectrum is described. The system incorporates effective angle or proximity dependent interference mitigation for conventional transmitters/receivers or master controlled constellations of wireless devices, and is suitable for temporary or permanent installation and use in a variety of outdoor and in-building locations. The antenna elements are configured and optimized for close proximity but unobtrusive positioning near the point of use on stages, in concert halls, movie studios, houses-of-worship, and convention centers, and are configured to be relatively unaffected by people or furniture in very close proximity. Methods for manufacturing and using close proximity antennas are disclosed, as are systems and methods for the generation and control of signals thereto.

5 Claims, 4 Drawing Sheets

(56) References Cited

U.S. PATENT DOCUMENTS

| | | | | |
|---|---|---|---|---|
| 2008/0037802 | A1* | 2/2008 | Posa | H04M 1/6033 381/77 |
| 2008/0096509 | A1* | 4/2008 | Ling | H04B 7/084 455/273 |
| 2008/0144864 | A1* | 6/2008 | Huon | H04R 1/20 381/305 |
| 2009/0264088 | A1* | 10/2009 | Li | H04B 1/1027 455/114.2 |
| 2010/0197232 | A1* | 8/2010 | Piket | H04M 9/082 455/63.1 |
| 2013/0039514 | A1* | 2/2013 | Knowles | H04R 1/26 381/107 |
| 2014/0009564 | A1* | 1/2014 | Cleve | H04M 3/002 348/14.08 |
| 2014/0098681 | A1* | 4/2014 | Stager | H04W 24/02 370/252 |

* cited by examiner

*Room Floor Plan*

WIRELESS CONFORMAL ANTENNA SYSTEM AND METHOD OF OPERATION

BACKGROUND OF THE INVENTION

Field of the Invention

The present invention relates to antennae, and more particularly to low profile readily configurable antennae which is based upon Provisional Patent application No. 61/341,941, filed 7 Apr. 2010, and which is incorporated herein by reference in its entirety.

Discussion of Prior Art

Localized antennas and radio transmission systems are well known in the art and typically comprise a signal source, a modulator, an RF generating transmitter, and a radiating antenna used in conjunction with a receiver that incorporates at least one antenna, an RF front end, a receiver and demodulation system, and an output system. The output system may comprise demodulated data, audio, video or other signals such as telemetry. Such systems are often used on stages, in churches, and other performance spaces and venues.

The use of radio spectrum for such local use is frequently hampered by the presence of external RF generators such as radio broadcasting, television, two-way radio systems and other systems such as paging systems and cellular telephony systems. Exacerbating the problem is the frequent requirement for more than one channel of information to be transmitted at a given time. For instance, an orchestra comprising numerous instruments may wish to have the instruments individually received so that further amplification can be achieved. In other instances, a combination of transmitters comprising one-way and two-way devices may interfere with one each other, and with distant yet powerful external RF generators. These distant RF generators may also interfere with the local use of relatively lower powered devices such as bodypacks, and battery powered wireless devices such as instrument pickups, microphones, transducers, data generators, and the like.

Crowded RF spectrum space makes it increasingly difficult for prior art low powered local RF transmission systems to reliably operate in without interference, noise and signal degradation. High fidelity, full bandwidth and very high reliability are required for effective use of local RF systems in churches, theaters, arenas, and other indoor and outdoor performance spaces or locations where use of such systems is common. Continued use of conventional long distance antenna systems for in building use has exacerbated the problem by picking up even more externally generated interference. Cost and performance limited receivers used in these applications have limited dynamic range and rely on analog transmission of frequency modulated signals to achieve near zero latency, which is a requirement for music, and desirable for voice applications. Frequency modulation (FM) is known for the so-called capture effect, which reduces interference, however FM capture effect is not effective in current art wireless body pack and microphone systems because carrier frequencies are not "zero beat" or precise enough to eliminate heterodyne beat note interference, even within same product families. Transmitters commonly used in so-called body packs and other devices such as wireless microphones and pickups typically employ channelized operation allowing users to select specific clear frequencies, either manually or automatically, but source oscillators are not precise, and synthesizers used to generate multiple frequencies may be noisy and produce inter-system interference and beat notes even without interference from external television, white space devices, or other unpredictable or uncontrollable sources of interfering radiofrequency interference.

It would be desirable to overcome the aforementioned limitations, and if antenna and wireless receiving systems used in wireless applications in buildings, trade show booths, stages, houses of worship, business conferences, political events and the like were more selective, were less susceptible to pickup of extraneous RF energy from undesired sources, and easier and more intuitive to use.

It would also be desirable if lower power levels could be reliably used, thereby lengthening battery life. It would be beneficial if antenna hardware, wires and other stands and supports could be made easier to use, or eliminated, or out of sight of performers, cameras or audiences during performances and film or television production. A convenient, small, low profile antenna system that was unobtrusive, flexible, yet effective, and that could be brought nearer to the transmitter would have the benefit of increased pickup of the desired signal rather than interfering signals from afar.

It would further be desirable if the use of multiple pickup local antennas could be easily used to make a wireless footprint that could be reconfigured at will in buildings and out of doors, to accommodate multiple users, even on the same channel, within a large building, convention, trade show or the like, especially if they were durable, and easy to use and place. Such devices, if they were easily manufactured with good consistency and well controlled processes for the rapid making of cosmetically appropriate articles for sale would make them commercially viable and within cost targets for a majority of end users.

BRIEF SUMMARY OF THE INVENTION

The invention is a generally flat, flexible magnetic loop type antenna optimized for placement close to or adjacent to a floor, such as a stage floor, or under a carpet, such as found in a church, and having a plurality of loops embedded inside, a robust matching section, and an output consisting of at least one signal line such as a coaxial or other cable that can be further routed to a receiver, a transmitter, a transceiver, or a reradiation system. The flat antenna may be embedded in a polymer that is durable and water tight using a layered process. The invention also consists of the method of using a proximate floor mounted antenna system to selectively receive and or transmit the low powered radiofrequency or "RF" signals to and from wireless devices such as wireless body packs, instrument transmitters, pickups, microphones and the like.

Operation of the system involves close placement of antenna and transmitter, both to improve pickup and reduce pickup of more distant interfering sources such as television, cellular, white space devices, and the like. The particular field pattern of the invention is chosen to favor high angle, close proximity sources and tends to reject low angle, more distant sources which typically occur at or near the horizon in many instances. The invention also comprises the method of using a plurality of positionable floor placed pad-like antennas to afford near proximity and diversity reception/transmission simultaneously, which is not easily achieved by typical stage and venue antenna systems that must be mounted above the floor. In one aspect, the floor mounted pad-like antennas are low profile and have uniform omnidirectional pickup patterns. In other aspects, the floor mounted pad-like antennas are shaped as circles, squares or geometric shapes that can be easily stacked for storage when not in use. In another aspect, the floor mounted pad-like antennas are used with frequency controlled transmitters that reduce heterodyne interference to each other even though they are on the same channel, but are spaced a distance therefrom. The invention further comprises the use of a plurality of magnetic loop elements connected in concentric fashion to a common, embedded transmission line feed system.

The invention thus comprises an antenna system with a plurality of floor antennas comprising: a first floor antenna, and a second floor antenna, each of said first and second antennas being spaced a distance apart within a defined area, and relatively coplanar thereto, whereby each of said first and second antennas have a higher sensitivity to near radiofrequency sources at angles above the horizon, and a lower sensitivity to sources located near the horizon. Each of said first and second antennas are preferably embedded in flat polymeric mats. Each of said first and second antennas are connected to separate receiver circuits. The near radiofrequency sources comprise at least two of said sources each on virtually the same frequencies. The virtually same frequencies are zero beat. The virtually same frequencies are controlled by a master oscillator external to at least one of said near radiofrequency sources.

The invention also includes a method of manufacturing a floor antenna assembly comprising steps of: molding a thin top layer of a polymeric liquid, and allowing it to harden to a polymeric solid of non-conductive dielectric material; installing a harness of wire in a specific pattern relative to top layer and generally coplanar thereto; and applying a bottom layer comprising the base, the total thickness of the assembly controlled to reduce or prevent tripping. The harness of wire preferably comprises concentric loops fed by a coaxial cable attached thereto and extending away from said loops, for connection to a further circuit. The invention also comprises a non-interfering, space diversity frequency sharing and reusing system for use within an area defined as a stage, a building, a performance space, or a house of worship, comprising a plurality of receivers tuned to the same frequency with pickup points placed a spaced distance apart, and, a constellation of radiofrequency sources having a frequency output effective to zero beat, whereby the capture effect at the discriminator of a receiver is effective to receive the first, nearest proximity radiofrequency source without beat notes or interference and reject a weaker signal on the same frequency from a second, less proximate radiofrequency source. The constellation of radiofrequency sources preferably comprises small battery powered portable transmitters. The constellation of radio frequency sources may also preferably comprise a plurality of wireless microphones.

The invention is further described as a non-interfering, space diversity frequency sharing and reusing system for use within an area defined as a stage, a building, a performance space or a house of worship, comprising a plurality of receivers tuned to the same frequency with pickup points placed a spaced distance apart, and a constellation of radiofrequency output effectively to zero beat, whereby the capture effect at the discriminator of a receiver is effective to receive the first, nearest proximity radio source without beat notes or interference and reject a weaker signal on the same frequency from a second, less proximate radiofrequency source.

DETAILED DESCRIPTION OF THE INVENTION

Figure 1:
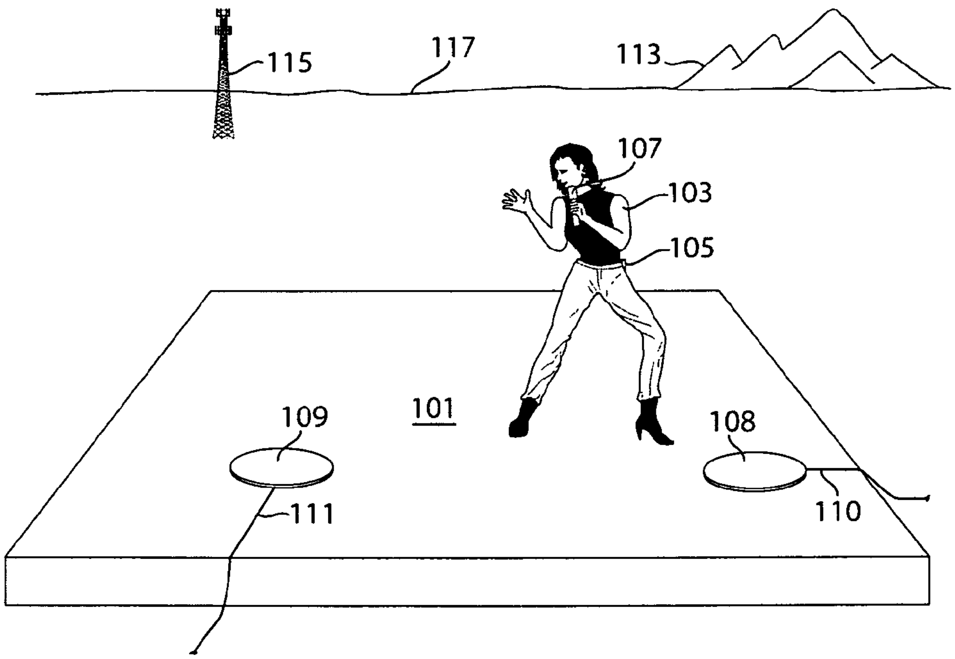
FIG. 1 is a perspective view of a typical stage arrangement with a performer thereupon, using a wireless device, and a plurality of floor positioned antenna pads that are an aspect of the invention.

Referring now to FIG. 1, the a perspective view of a typical stage arrangement with a performer thereupon, using a wireless device, and a plurality of floor positioned antenna pads, stage 101 may be comprised of various materials that are important to the operation of the invention, such as metal, wood, concrete or carpet, or earth. Performer 103 may wear wireless bodypack 105, which is a low power battery operated transmitter that can be concealed and connected to a musical instrument such as an electric guitar (not shown). Performer 103 may also use a wireless microphone 107, which is comprised of a battery powered transmitter connected to an air coupled transducer capable of picking up vocal or music sounds and generating a modulated low power radio signal. A first floor-antenna 108 is preferably positioned flat upon the stage 101 or as part of the stage, as an unrolled rug, mat and/or part of the set, which may also require some contouring, in such a way as to be out of sight of the audience, and also in such a low profile to minimize trip hazard. Similarly, a second floor-antenna 109 may be positioned at another location upon the stage 101, depending on the anticipated coverage area needed by performer 103. Coaxial cables 110 and 111 may run away from of through the stage 101 in an unobtrusive fashion and be connected to various types of electrical equipment.

Still referring to FIG. 1, distant hills 113 may generally be viewed near the horizon line 117, and television antennas 115 may also be viewed along the horizon line, both being generally at a much greater distance from the floor antennas 108 and 109 than either the wireless body pack 105 or the wireless microphone 107, or the performer 103.

Figure 2:
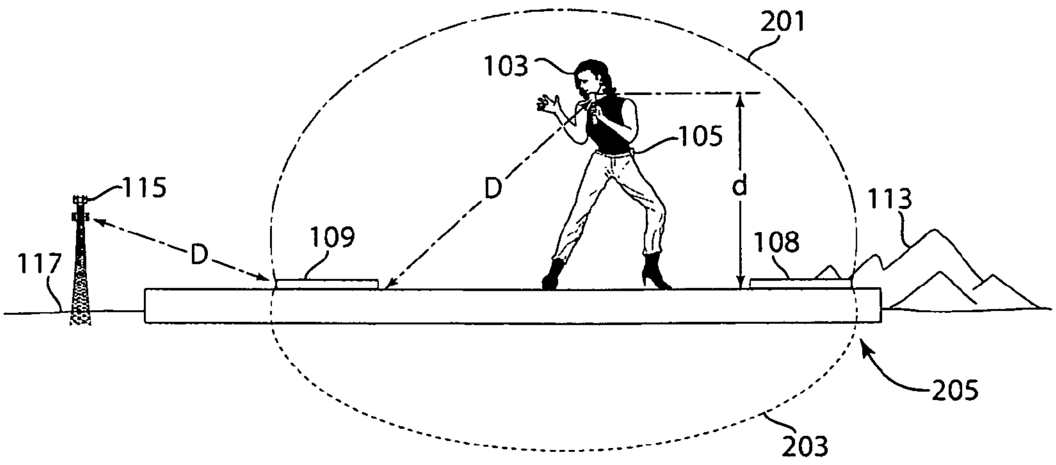
FIG. 2 is an elevation view of the stage of FIG. 1 further depicting the general radiation reception pattern of floor mounted antenna assembly when used in close proximity to a stage or floor surface, having a relatively high angle of response, and a relatively low pickup of distant sources at the horizon, such as a television transmitter.

Referring now to FIG. 2, the distance and angle relationship of the performer 103 with respect to the floor antennas 108 and 109, and the horizon line 117, with the television transmitter 115 and mountains 113 can be seen. Distance d is short, generally no more than the height of the performer 103. Transmission distance D to the nearest floor mounted antenna may be somewhat longer, but not very far in comparison to the distance of miles that may be encountered with television transmission towers. Television transmission signal strength is high to cover a large geographic area and proximity, or distance alone may not be sufficient to help mitigate interference to the local system operating near the performer. For that reason, floor antennas 108 and 109 may be arranged electrically to operate with a high angle of acceptance and relative in-plane rejection, affording some degree of horizon angle interference reduction, while optimizing the use of performer-worn or held transmitters that are almost always in a position representing a higher angle during use. In general, antennas may be characterized as having lobes. Dipole or loop antennas may have a so-called dipole response where the broad sides of the antenna are most sensitive and the ends are least sensitive. Such a dipole pattern in free space is generally symmetrical. When the antenna is held close to a ground, the pattern may become highly asymmetrical. Such an asymmetrical pattern is represented by upper antenna pattern 201 in FIG. 2, where one lobe is oriented straight up, and bottom lobe 203, shown as dashed lines, directed straight down. As can be seen in FIG. 2, the orientation of bottom lobe 203 at or near floor level puts its pickup pattern out of the direction of many above ground interfering sources. Orientation of the antenna flat on the floor also produces a null that is oriented parallel to the floor and horizon, at any compass direction. This is very desirable for the purpose of reducing interfering signals that tend to arrive at low angles, typically at a distance, but also from an audience, who may have possession of interfering devices, or nearby personnel and vehicles, as well as other wireless systems that are not within the immediate stage area.

Figure 3:
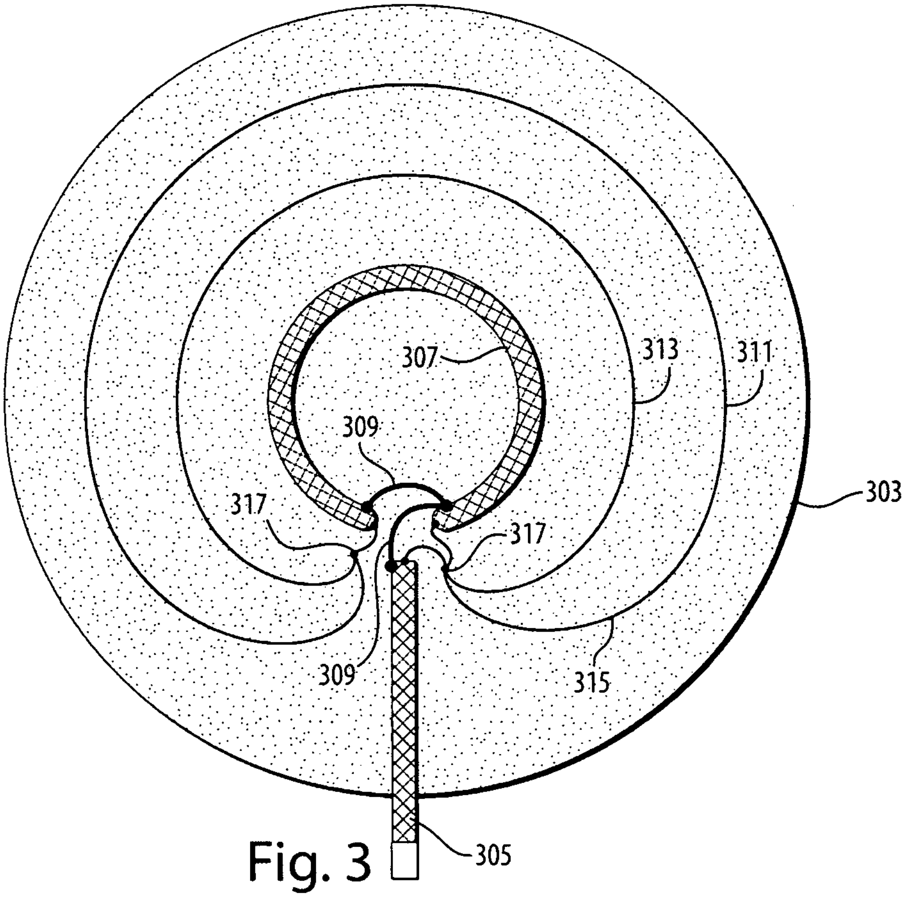
FIG. 3 is a plan view of a floor mountable antenna assembly before embedment showing radiating loops and matching network arranged in a generally circular configuration.

Referring now to FIG. 3, a plan view of a floor mountable antenna assembly before embedment showing radiating loops and matching network arranged in a generally circular configuration, the outer or top layer 303 may be a circle of cut rubber, or cast from a thermoset polymer, such as Plastisol, which is a liquid thermosettable polyvinyl resin that cures into a rubber-like consistency when heated to a temperature of about 140 C. or more for a period of five minutes and allowed to cool. Antenna, balun and feedline harness 315 may be soldered or crimped together in advance and positioned over top layer 303, which remains underneath harness 315 during the molding process. Harness 315 may be comprised of a feedline 305, such as a coaxial cable, configured as a half-wave balun 307 by looping a portion of coax and connecting the shield jumper 309. Center conductors 317 are connected to feedline 305 on one end of balun 307. Center conductors 317 are connected to first loop 311 and second loop 313, as shown, forming a loop antenna structure that may be impedance matched to a common 50 Ohm or 75 Ohm feedline. First loop 311 and second loop 313, if in free space, would have a characteristic impedance of about 400 Ohms, which is typical of a full-wave loop. In parallel, the average feedpoint impedance is generally reduced. Half wave balun 307 is well known to transform an unbalanced low impedance to a balanced, higher impedance. Generally the loop portion of the balun has a length of the wavelength times the velocity factor/2. A typical velocity factor V for common coaxial cables may be from 0.66 to 0.90 C. Velocity V is the speed of light in free space, but slower when in or near dielectric materials that may have various dielectric constants that affect the speed of light or the speed of radiofrequency energy transmitted therethrough.

Figure 4:
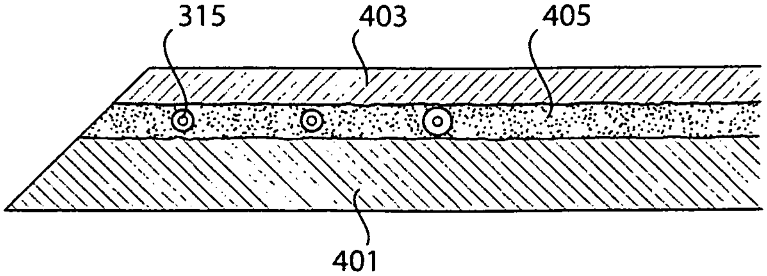
FIG. 4 is a cross sectional side view of the floor mountable antenna assembly showing the layers comprising the base, the center section, and the cover.

Referring now to FIG. 4, a cross sectional side view of the floor mountable antenna assembly showing the layers comprising the base, the center section, and a cover, the floor mounted antenna may be built top down or bottom up, the advantage of bottom up being that a tapered pan or form may be used, such as for example, a pizza pan, to cast the floor mounted antenna into a convenient circular shape. Other shapes and forms may be used comprising mats, rectilinear or geometric shapes, and have markings indicating use embossed therein during the casting process. A top down process is as follows and shown in FIG. 4; Top layer 403 is first molded, for example, in a thin layer of between 1/16" of an inch to about 3/16' of an inch thickness and allowed to cure. Harness 315 is then placed upon top layer 403 and may be tacked into place with additional adhesive layer 405, to prevent it from being moved during subsequent processing. Bottom layer 401 is finally cast comprising the base, which may be from 1/8" to 1/2" in thickness, the preference being a thinner total thickness of the assembly to reduce or prevent tripping and creating a bump under a rug.

Figure 4A:
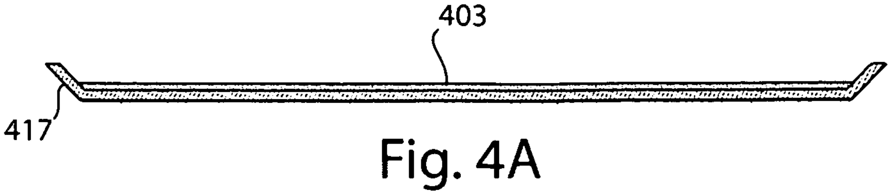
FIG. 4*a* is a pizza pan or mold shape.

FIG. 4*a*, the pizza pan or other mold form 417, is here shown face up where top layer 403 would be the first layer formed, followed by subsequent layering (not shown in 4*a*) until the assembly of FIG. 4 is accomplished. Other molds including injection molds, pressure melting between strips or pads of thermoplastic materials with heat and or pressure may be used to capture the harness 315. Harness 315 of FIG. 4 may be manufactured of conventional wires such as copper wires and coaxial cables, or of flexible printed circuit materials according to the principles of the invention.

Figure 5A:
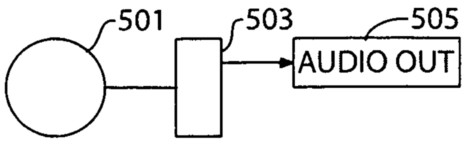
FIG. 5*a* is a block diagram of a single floor mountable antenna connected to a receiver.

Referring now to FIG. 5*a*, a block diagram of a single floor mountable antenna 501 connected to a receiver 503, the traditional antenna to receiver connection is made to produce a demodulated audio output of the signal. In wireless audio application, the present method of transmitting a signal is via FM or frequency modulation. FM is useful because it exhibits a capture effect, whereby the strongest of two signals on exactly the same frequency is the only one detected at the discriminator circuit of the receiver. This effect makes FM radio as we know it today relatively interference-free and requires that any two nearby FM stations in a geographic area have a carrier frequency that is within a few Hz of each other, by statute. In the case of digital transmissions, similar rules may apply to reduce broadcast interference. In wireless devices such as body packs, wireless microphones and the like, no such rules exist, and carrier frequencies may vary by 100, 200 or more Hz even though fairly precise crystal control and synthesizers may be incorporated in the transmitters. 100, 200 or more Hz are within the audible frequency band and the difference, called a beat note, or heterodyne, cannot be easily rejected at the discriminator and therefore produces interference at the audio output 505 when the two signal sources are not precisely on the same frequency or nearly so. This interference effect can reduce the number of available channels in a given local area, wasting spectrum space.

Figure 5B:
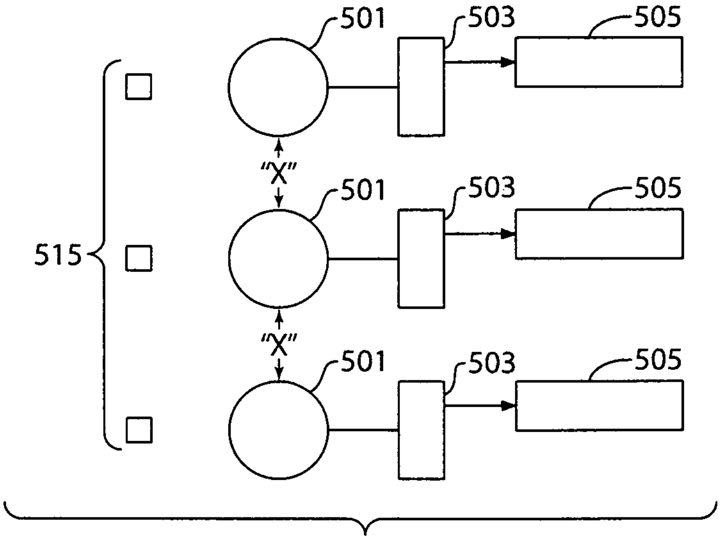
FIG. 5*b* is a block diagram of a plurality of floor mountable antennas connected to a plurality of receivers tuned to different frequencies.

FIG. 5*b* is a block diagram of a plurality of floor mountable antennas 501 connected to a plurality of receivers 503 tuned to the same frequencies, but spaced a distance "X" from each other. Current art transmitters 515 will heterodyne or beat against each other and into adjacent receivers eliminating the possibility of reusing valuable spectrum, even though the transmitters and receivers are spaced apart. As previously taught and referring back to FIG. 2, antenna pattern 201 exhibits side rejection by virtue of a null which is parallel to the floor. This should reduce the mutual pickup of any two or more floor mountable antennas as taught herein when they are placed a distance but adjacent and on the same plane, which is naturally within the rejection null that exists at or near the horizon angle. Signal strength reductions or differences of at least 10 dB or more can be achieved with this method of using floor mounted adjacent nulling antennas, which is sufficient for perfect or nearly perfect capture effect in properly, precisely tuned and/or coordinated transmitters on the same frequency with a difference in transmitted signal that is very close, to within 1 or 2 Hz or so. Referring back to FIG. 5*b*, three separate, ordinary adjacent transmitters 515 may be used in one arena, hall or theatre, tuned to the same channel. However, interference will result at the audio outputs 505 of each receiver, despite the capture effect, because of frequency errors. Such a beat note or heterodyne sounds like a whistle or tone that is very clearly audible and undesirable.

Figure 5C:
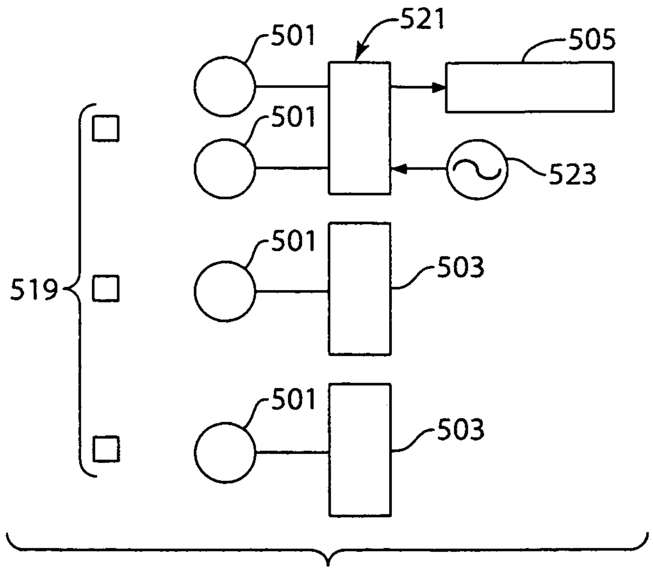
FIG. 5*c* is a block diagram of a plurality of floor mountable antennas connected to multiple receivers, and operating on the same channel, with at least one device in near proximity also transmitting a coordinating or controlling reference frequency.

A solution to this serious problem of interference and improvement in the ability to reuse precious spectrum with reasonable physical separation is shown in FIG. 5*c* a block diagram of a plurality of floor mountable antennas connected to multiple receivers, and operating on the same channel, with at least one device in near proximity also transmitting a coordinating reference frequency to precisely tune and provide a reference for any other transmitters within near proximity, and on the same channel. A constellation of master and slave controlled transmitters 519 may be used to eliminate beat or heterodyne interference and take advantage of the at least 10 dB of capture effect isolation afforded by the teachings of this invention as follows: Master oscillator 523 may be embedded in control receiver 521, the advantage being that the control receiver 521 may be at an operator control point, although the master oscillator may be placed at other locations within the constellation. Master receiver 521 sends reference signal to floor mounted antenna 501 where it can be sent to all of the transmitters 519 used in the constellation of same frequency devices. It should be noted that the master oscillator could drift or be imprecise as long as all of the slaves follow it precisely. It should also be pointed out that other master reference frequency sources external to the constellation exist and may be utilized to accomplish the principles and objectives of this invention. These other sources may comprise GPS signals, cellular system signals and SMPTE time code signals that may be transmitted and pickup up over wide or local areas, the important factor being that all transmitters in the constellation remain coordinated and on or very near the exact transmitting frequency at all times.

Figure 5D:
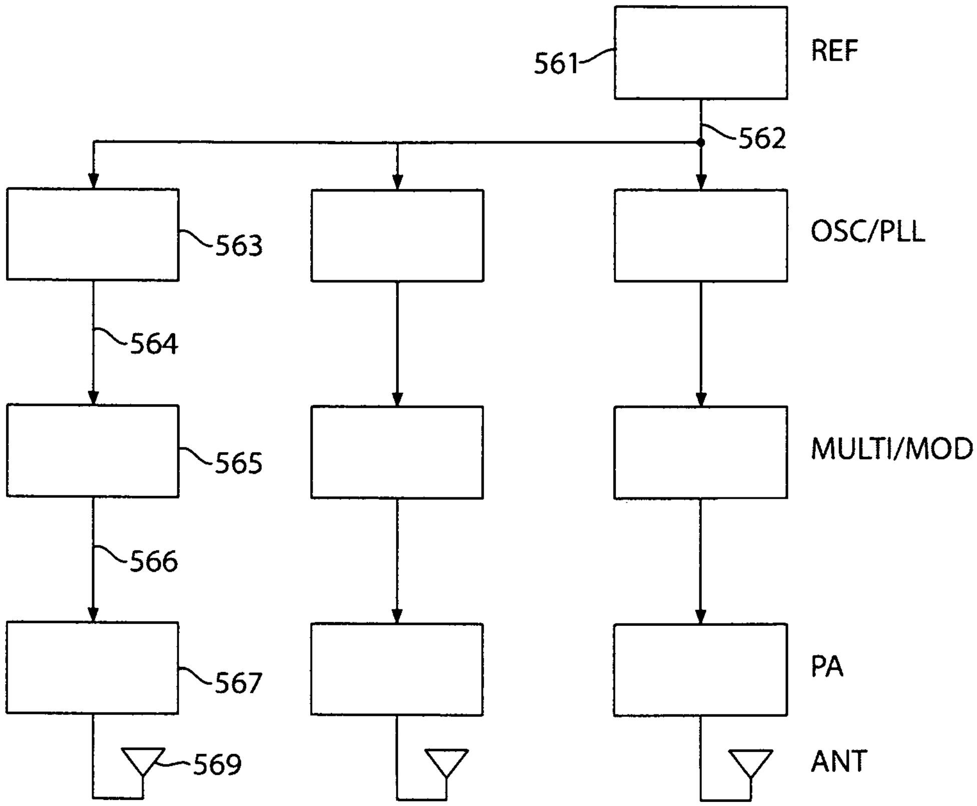
FIG. 5*d* is a block diagram of a plurality of floor mounted antennas connected to a first signal source that transmits through the floor antenna to space in near proximity, and a receiver that receives a second, reradiated signal from a device modulated by the first signal and acoustic energy applied thereto.
Figure 6:
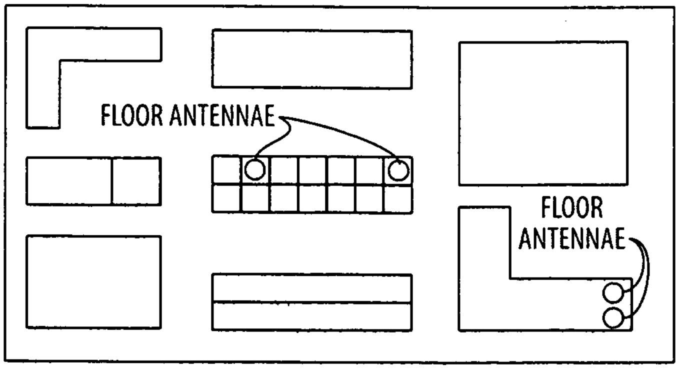
FIG. 6 is a plan view of a room, such as a convention hall, showing relative placement of a plurality of floor mounted antennas that may share a single channel without mutual interference, the lack of interference afforded by the close proximity pickup and relative distant rejection of the floor mounted antennas, when used in conjunction with frequency synchronized transmitters.

Such a system may comprise a circuit further shown in block diagram format in FIG. 5*d*, the master and control circuit, which is but one possible configuration of known master-slave frequency coordination systems known in the art that have not been applied previously to solve the problems presented in this invention, because they are not obvious, nor were they apparent or practical until now. Reference signal 562, which is preferably at a frequency not the same as the final transmission frequency, but is instead a fraction to be multiplied, is generated by master oscillator 561, preferably through RF transmission. Lines in FIG. 5*d* do not represent wires, but represent the flow of signals by any means, including RF, AF, lightwave or galvanically. Reference signal 562 is then sent to control oscillator and phase locked loop 563, which is commonly known to rely upon the presence of a reference signal such as that delivered from master oscillator 562. Oscillator and phase locked loop 563 will lock very precisely to the reference frequency and follow it even if the reference frequency drifts. Output of locked signal 564, which is very precise, is sent into multiplier and modulator 565, which comprises a phase modulator well known in the radio art to superimpose amplitude such as the audio signals from a microphone, a guitar, or cellular telephone (not shown) onto a carrier frequency as a function of phase or frequency. The multiplication of the frequency may be accomplished by one or more of the following common devices: A second oscillator and mixer, a nonlinear multiplier, such as a diode, a frequency synthesizer, such as a digital frequency synthesizer. The advantage goes to the most precise and repeatable upconversion device that stays locked on the desired frequency with good reliability, and with the lowest noise, sometimes referred to as synthesizer noise. It is recognized by the inventor that better quality synthesizers are known, and have higher cost. The extra cost of such a precise system is far outweighed by the benefit of reutilizing precious radio frequency spectrum, it is believed. Modulated and upconverted signal 566 may then be sent to power amplifier 567, which is effective to increase the strength of the modulated upconverted signal sufficient to be sent to antenna 569 where modulated RF may emanate therefrom. It can be seen that the train of events depicted in FIG. 5*d* will result in a final output frequency among a constellation of devices that are the same or nearly the same. Small differences of a few Hz, such as 1-20 Hz, may not be important, as the subsequent reception of the signal may provide a commonly known high pass function to eliminate low frequency components that are not commonly part of music or speech.

What has been shown is a system and method that improves the ability to send interference free signals over local systems even if they are on the same frequency, as long as there is good physical separation of the signal and precise frequency coordination. Each of these improvements on its own are novel and valuable, even if not used together. High angle receiving and low angle rejecting floor mounted antennas solve placement problems and reduce interference, and are convenient, out of sight, low profile, and easily manufactured and used. They may be placed a spaced distance adjacent to each other without much mutual coupling, unlike typical free space antennas up in the air, which are not naturally aligned by virtue of the floor plane, and they may be used alone to enhance the reception of wireless signals as taught herein. The use of master and slave transmitters has not been applied previously to low powered constellations of wireless devices used in churches, theatres, stages, concert halls, and other venues for the purpose of reutilizing precious radio frequency spectrum while taking advantage of the capture effect of at least 10 dB signal difference, which is easily afforded with the floor mounted antennas, but may be afforded by other well spaced and placed antennas as well. This new, useful and non-obvious invention is to be interpreted and limited only by the scope of the concepts described herein, its teachings and variations being examples known to the inventor, and by the claims.

The invention claimed is:

1. A non-interfering, space diversity frequency sharing and reusing system for use within an area, the area selected from a group comprised of: a stage, a building, a performance space, or a house of worship, the space diversity frequency sharing and reusing system comprising:

a plurality of receivers each tuned to a common particular frequency with stationary pickup points placed a spaced distance apart in the area;

a constellation of nearby mobile radiofrequency sources within the area having a frequency output effective to zero beat, whereby a discriminator of one of the plurality of receivers is effective to receive a first signal on the common particular frequency from a nearest proximate source of the constellation of sources without beat notes or interference and to reject a weaker signal received on the common particular frequency from a second less proximate source of the constellation of sources;

wherein the nearest proximity source is coupled to a common master oscillator and receives a reference frequency signal from the common master oscillator to generate a first zero beat frequency to transmit the first signal;

wherein the second less proximate source is coupled to the common master oscillator and receives the reference frequency signal from the common master oscillator to generate a second zero beat frequency to output the weaker signal; and wherein the first zero beat frequency and the second zero beat frequency are substantially equal and are controlled by the reference frequency signal from the common master oscillator.

2. The non-interfering space diversity frequency sharing and reusing system as recited in claim 1, wherein said constellation of mobile radiofrequency sources comprise small battery powered portable transmitters.

3. The non-interfering space diversity frequency sharing and reusing system as recited in claim 2, wherein said constellation of mobile radio frequency sources comprise a plurality of wireless microphones.

4. The receiver and sources of claim 1, wherein the reference frequency signal is obtained from a source external to the space diversity frequency sharing system.

5. The non-interfering space diversity frequency sharing and reusing system as recited in claim 1, wherein frequency modulation is employed as an emission source in the constellation of sources, and a discriminator circuit is employed in the one of the receivers.

* * * * *